United States Patent [19]

Wurl et al.

[11] Patent Number: 4,962,960
[45] Date of Patent: Oct. 16, 1990

[54] ARRANGEMENT FOR FIXING A TOP OF A MOTOR VEHICLE

[75] Inventors: Willi Wurl, Niefern-Oeschelbronn; Benjamin Dimson, Tiefenbronn-Muehlhausen; Rainer Uerlings, Rutesheim, all of Fed. Rep. of Germany

[73] Assignee: Dr. Ing. h.c.F. Porsche Aktiengesellschaft, Fed. Rep. of Germany

[21] Appl. No.: 479,200

[22] Filed: Feb. 13, 1990

Related U.S. Application Data

[63] Continuation of Ser. No. 230,960, Aug. 11, 1988, abandoned.

[30] Foreign Application Priority Data

Aug. 25, 1987 [DE] Fed. Rep. of Germany ....... 3728267

[51] Int. Cl.[5] .............................................. B60J 7/185
[52] U.S. Cl. ................................. 296/120.1; 296/121; 292/DIG. 5
[58] Field of Search ............ 296/216, 218, 224, 120.1, 296/121; 292/DIG. 5

[56] References Cited

U.S. PATENT DOCUMENTS

| | | |
|---|---|---|
| 1,176,205 | 3/1916 | Cutlip ........................... 296/120.1 X |
| 2,548,105 | 4/1951 | George .............................. 296/107 |
| 3,584,912 | 6/1971 | Leger .............................. 296/121 X |
| 3,774,959 | 11/1973 | Brudy .................................. 296/121 |
| 4,252,365 | 2/1981 | Ferguson ............................ 296/216 |

FOREIGN PATENT DOCUMENTS

| | | |
|---|---|---|
| 1580535 | 12/1970 | Fed. Rep. of Germany . |
| 1755619 | 1/1976 | Fed. Rep. of Germany . |
| 3329406 | 2/1985 | Fed. Rep. of Germany . |
| 383793 | 1/1965 | Switzerland . |
| 2076751 | 12/1981 | United Kingdom ................ 296/224 |

Primary Examiner—Dennis H. Pedder
Attorney, Agent, or Firm—Evenson, Wands, Edwards, Lenahan & McKeown

[57] ABSTRACT

An arrangement for fixing in position a top of a passenger motor vehicle includes a first member retained in position at the windshield frame which form-lockingly cooperates in the closed position of the top with a second member attached at the top. In order that this arrangement which has a simple construction with good functioning and which requires little structural space—as viewed in the vertical direction—, the first member is formed by an upwardly directed, transversely extending leg adjoining a recess which is surrounded by a downwardly open receiving section of the second member, whereby a web of the receiving section facing the windshield frame protrudes into the recess.

16 Claims, 2 Drawing Sheets

ARRANGEMENT FOR FIXING A TOP OF A MOTOR VEHICLE

This is a continuation, of application Ser. No. 07/230,960, filed Aug. 11, 1988, abandoned.

BACKGROUND AND SUMMARY OF THE INVENTION

The present invention relates to an arrangement for positionally securing a top of a motor vehicle, especially of a passenger motor vehicle, whereby in a closing position of the top, a first member of the arrangement retained in position at the windshield frame form-lockingly cooperates with a second member provided at the top and fixes the top in the longitudinal and transverse direction.

In a known installation (DE-PS 15 80 535), the arrangement for positionally fixing the top includes a pin secured at the lateral longitudinal girder which is aligned approximately vertically and engages into a sleeve arranged at the windshield frame disposed therebelow. The sleeve is inserted into an opening of a hollow bearer-like mounting of the windshield frame.

This installation entails the disadvantage that the arrangement requires a relatively large structural space—as viewed in height direction. Furthermore, costly measures for the creation of the hollow bearer-like mounting are required at the windshield frame.

It is the object of the present invention to provide an arrangement for positionally fixing a top which combined with good functioning has a simple construction and requires little structural space, as viewed in the height direction.

The underlying problems are solved according to the present invention in that the first member—as viewed in the longitudinal direction—includes an upwardly directed, transversely extending leg adjoining a recess, which is surrounded by a receiving or mounting section of the second member open in the downward direction, whereby a web of the receiving section facing the windshield frame protrudes into the recess.

The advantages principally attained with the present invention reside in that an arrangement for positionally fixing the top which is simple in construction is created by the recess and the upwardly directed transversely extending leg of the first member adjoining the same and by the downwardly open receiving section of the second member, which combined with good functioning requires little structural space—as viewed in the height direction. Owing to the one-piece construction of the first member of the arrangement with a mirror leg of an interior rear-view mirror, additional fastening elements for the first member can be dispensed with. Furthermore, one central arrangement in accordance with the present invention located approximately in the vehicle center suffices for positionally securing the top.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
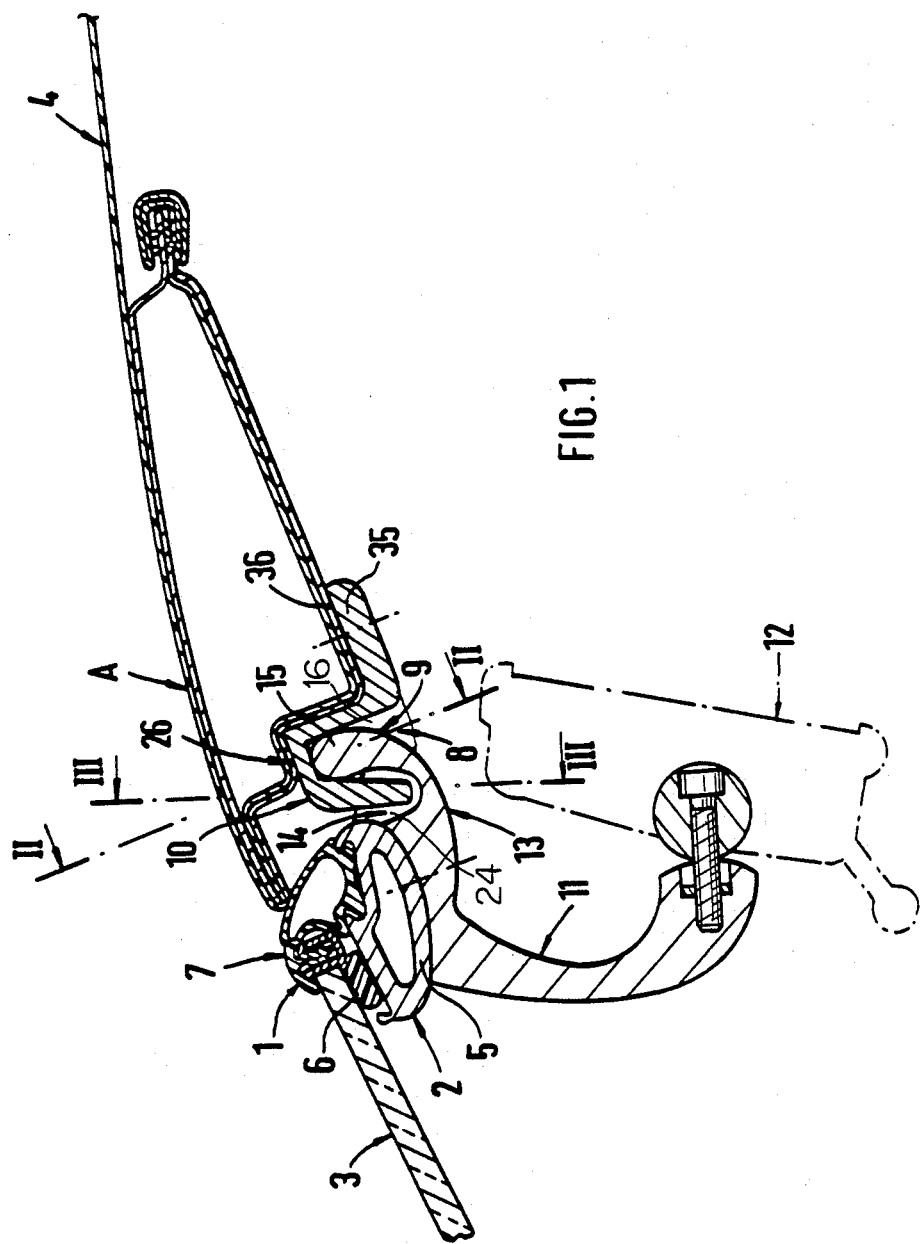
FIG. 1 is a center longitudinal cross sectional view through a windshield frame with an arrangement for positionally fixing a top of a motor vehicle in accordance with the present invention.

Referring now to the drawing wherein like reference numerals are used throughout the various views to designate like parts, the passenger motor vehicle illustrated in FIG. 1 includes a body 1 which, in the illustrated area, is formed by a windshield frame 2, a windshield 3 and a top 4. The windshield frame 3 is formed by a hollow body-like extrusion profile 5 which is arranged on the inside of the windshield 3 and is connected with the same by way of an adhesive element 6.

The top 4 rests with its forward edge on a sealing member 7 arranged at the body and is detachably retained in position at the windshield frame 2 by latching mechanisms (not shown).

Furthermore, an arrangement 8 for positionally securing the top 4 in its closing position A (FIG. 1) is provided, by means of which the top 4 is positionally fixed in the longitudinal and transverse direction before the latching mechanisms are locked.

The arrangement 8 includes a first member 9 secured at the windshield frame 2 which, in the closing position A of the top 4, cooperates form-lockingly with a second member 10 fixed with the top 4. According to FIG. 1, the first member 9 is constructed in one piece with a mirror leg 11 of an interior rear view mirror 12 attached approximately in a vehicle longitudinal center plane whereby the mirror leg 11 is held in position at the windshield frame 2 by means of fastening bolts (not shown).

Figure 4:
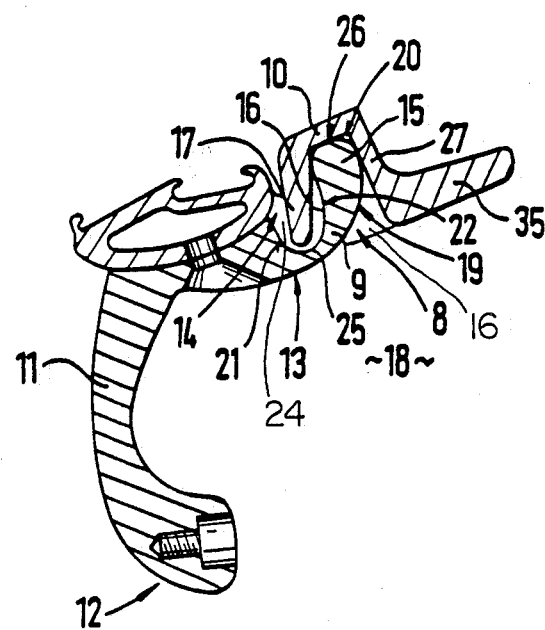
FIG. 4 is a partial cross-sectional view of FIG. 1.

The first member 9 adjoins an upwardly disposed area of the mirror leg 11 and includes--as viewed in the longitudinal direction--a recess 14 and an upwardly directed, transversely extending leg 15 formed-on at the same. The leg 15 is surrounded in the closing position A by a downwardly open receiving section 16 of the second member 10, whereby a web 17 of the receiving section 16 facing the windshield frame 2 protrudes into the recess 14 (FIG. 4). The leg 15 of the first member 9 is drawn upwardly bow-shaped on the side facing the passenger space 18 and extends in continuation of the shape of the mirror leg 11. An upper end area 20 of the leg 15 includes a cross-sectional enlargement that is constructed as a rounded element.

Figure 3:
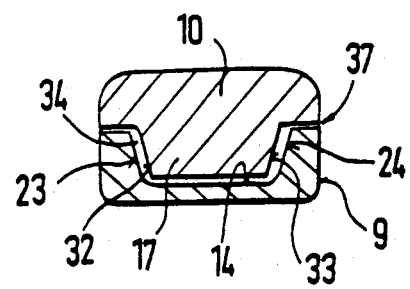
FIG. 3 is a cross-sectional view, of the positioning members of the vehicle top without showing the frame of the top and taken along line III-III of FIG. 1.

The recess 14 of the first member 9, which is open in the upward direction, is constructed trough-shaped and is defined by a forward boundary wall 21, a rear wall section 22 and the lateral walls 23 and 24 (FIGS. 3 and 4). The forward boundary wall 21 adjoins the wall section 22 by way of a rounded-off transition area 25. The lateral walls 23 and 24 of the recess 14 are arranged inclined to a vertical plane in such a manner that the recess 14 tapers downwardly—as viewed in transverse direction (FIG. 3).

The recess 14 is arranged directly behind the windshield frame 2 as viewed in the driving direction. The transition area 25 of the recess 14 is approximately flush with a lower edge of a windshield frame 2.

Figure 2:
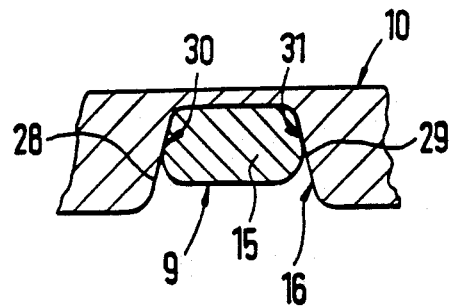
FIG. 2 is a cross-sectional view, of the positioning members of the vehicle top without showing the frame of the top and, taken along line II-II of FIG. 1.

The spherical end area 20 of the leg 15 cooperates form-lockingly with a bottom 26 of the receiving section 16 of the second member 10. The receiving section 16 includes two webs 17 and 27 arranged approximately V-shaped to one another, whereby the leg 15 abuts locally at the webs 17 and 27 as well as at the bottom 26 (fixation in the longitudinal direction). Laterally the two webs 17 and 27 are connected with each other section-wise by way of wall sections 28 and 29 so that the receiving section 16 has section-wise also a trough-shaped configuration (FIG. 2). The receiving section 16 tapers in the upward direction as viewed in the transverse direction. The leg 15 of the member 9 is matched to the shape of the receiving section 16 so that the lateral boundary surfaces 30 and 31 of the leg 15 abut at the wall sections 28 and 29 of the receiving section 16 (fixation in the transverse direction).

The web 17 of the receiving section 16 is matched to the configuration of the trough-like recess 14—as viewed in transverse direction—, whereby the side walls 32 and 33 of the web 17 extend toward the walls 23 and 24 of the recess 14 under formation of a gap 34. The receiving section 16 is arranged exclusively in a center area of the transverse dimension of the second member 10. Laterally adjacent the receiving section 16, the second member 10 is constructed approximately angularly shaped, as viewed in cross section, whereby a flange 35 extends at the lower end of the vertical web 27 which is bent-off approximately at right angle thereto. The second member 10 is secured at a frame part 36 of the top 4 disposed thereabove by fastening bolts. Laterally adjacent the leg 15 a gap 37 is provided—as viewed in the height direction--between the first member 9 and the second member 10 disposed thereabove (FIG. 3).

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for longitudinally and laterally positionally fixing a top of a vehicle of the type having windshield frame means, comprising a laterally extending header means, and an interior rearview mirror supported adjacent the header means, said positionally fixing arrangement
   a first separate member detachable and attachable from and to the laterally extending header means of the windshield frame means, said first member being integrally formed and exhibiting an upwardly facing first positioning contour and a downwardly extending leg for carrying a vehicle interior rearview mirror;
   and a second member fixedly attachable to a vehicle top, said second member exhibiting a downwardly facing second positioning contour having a substantially hollow cavity provided with side walls, an end wall opposite the second downwardly facing contour and a top portion and wherein said cavity is configured to mate with the upwardly facing positioning contour of the first member to longitudinally and laterally fix the position of the top with respect to the windshield frame means by engagement of the first member with the walls and second downwardly facing contour.

2. An arrangement according to claim 1, wherein said first positioning contour includes an upwardly open trough-shaped first member recess.

3. An arrangement according to claim 2, wherein the first member recess is disposed to the rear of the laterally extending header means of the windshield frame means when in an in-use position in a vehicle.

4. An arrangement according to claim 1, wherein said second positioning contour includes a downwardly open second member recess.

5. An arrangement according to claim 4, wherein the first positioning contour includes a substantially round shaped end area at an upper end of the first member, which round shaped end area is engagable in the second member recess when in an in-use position.

6. An arrangement according to claim 2, wherein the first member recess tapers upwardly and laterally outwardly in the shape of a truncated cone, as viewed in a transverse cross-section of the vehicle when in an installed position.

7. An arrangement according to claim 3, wherein the first member recess tapers upwardly and laterally outwardly in the shape of a truncated cone, as viewed in a transverse cross-section of the vehicle when in an installed position.

8. An arrangement according to claim 7, wherein said second positioning contour includes a downwardly open second member recess.

9. An arrangement according to claim 8, wherein a downwardly extending free leg section of the second member engages in the first member recess and forms a forward side of the second member recess, when in an installed in-use position.

10. An arrangement according to claim 4, wherein the second member recess is constructed as an approximately truncated V-shape, as viewed in transverse cross-section of the vehicle, whereby said top of the second member recess is substantially matched to a portion of said first positioning contour on an upper end area of a leg of the first member.

11. An arrangement according to claim 9, wherein said first positioning contour includes a substantially round shaped end area at an upper end of the first member, which round shaped end area is engagable in the second member recess when in an in-use position.

12. An arrangement according to claim 9, wherein the second member recess is constructed as an approximately truncated V-shape, as viewed in transverse cross-section of the vehicle, whereby said top of the second member recess is substantially matched to a portion of said first positioning contour on an upper end area of a leg of the first member.

13. An arrangement according to claim 12, wherein said first positioning contour includes a substantially round shaped end area at an upper end of the first member, which round shaped end area is engagable in the second member recess when in an in-use position.

14. An arrangement according to claim 1, wherein said first member and second member serve as the sole members for longitudinally and laterally positionally fixing the top at the laterally extending header means of the windshield frame means.

15. An arrangement according to claim 6, wherein said first member and second member serve as the sole members for longitudinally and laterally positionally fixing the top at the laterally extending header means of the windshield frame means.

16. An arrangement according to claim 12, wherein said first member and second member serve as the sole members for longitudinally and laterally positionally fixing the top at the laterally extending header means of the windshield frame means.

* * * * *